US006606636B1

(12) United States Patent
Okazaki et al.

(10) Patent No.: US 6,606,636 B1
(45) Date of Patent: *Aug. 12, 2003

(54) METHOD AND APPARATUS FOR RETRIEVING DYNAMIC IMAGES AND METHOD OF AND APPARATUS FOR MANAGING IMAGES

(75) Inventors: Hiroshi Okazaki, Yokohama (JP); Hiroaki Sato, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/281,007

(22) Filed: Jul. 27, 1994

(30) Foreign Application Priority Data

Jul. 29, 1993 (JP) .............................................. 5-188298
Jun. 8, 1994 (JP) .............................................. 6-125990

(51) Int. Cl.[7] .............................................. G06F 17/00
(52) U.S. Cl. ........................ 707/104.1; 707/1; 707/102
(58) Field of Search ...................... 345/1–358, 794–804; 707/1–513; 382/254–260

(56) References Cited

U.S. PATENT DOCUMENTS

| 4,782,399 A | | 11/1988 | Sato ........................... 358/280 |
| 5,091,849 A | * | 2/1992 | Davis et al. ................. 395/100 |
| 5,095,447 A | * | 3/1992 | Manns et al. ............... 395/161 |
| 5,113,494 A | * | 5/1992 | Menendez et al. .......... 395/163 |
| 5,155,588 A | * | 10/1992 | Levien ........................ 345/150 |
| 5,436,985 A | * | 7/1995 | Li ............................... 382/253 |

OTHER PUBLICATIONS

"Scene Retrieval Method Using Temporal Condition Changes", Systems and Computers in Japan, vol. 24, No. 7, 1993, pp. 92–101, S. Abe et al.
"A Proposal Of Multimedia Document Architecture And Video Document Architecture", International Conference On Communications, vol. 1, Jun. 23, 1991, Denver, US, pp. 511–515, W. Kameyama et al.
"Automatic Video Indexing and Full–Video Search For Object Appearances", Visual Database Systems, vol. II, 1992, pp. 113–127, A. Nagasaka et al.
"Image Retrieval Adapted for Subjective Similarity", Information Processing Society, vol. 31, No. 2, pp. 227–236, Feb. 1990. (English portions are considered but non–English portions are not considered).

* cited by examiner

Primary Examiner—David Jung
(74) Attorney, Agent, or Firm—Fitzpatrick, Cella, Harper & Scinto (57) ABSTRACT

A scene change automatic detection unit detects a scene change at the time of input storage of a dynamic image in a storage unit, to retrieve the dynamic image as a search key, and a characteristic amount unit calculates a characteristic amount of each scene. The characteristic amount is stored together with the dynamic image in the storage unit. In a retrieval operation, a scene change automatic detection unit detects a scene change of a dynamic image entered and a scene change automatic detection unit calculates a characteristic amount of each scene. A correspondence determination unit compares a characteristic amount of a stored dynamic image and a characteristic amount of a dynamic image entered as a search key and determines the correspondence of these characteristic amounts.

26 Claims, 13 Drawing Sheets

FIG. 3

$G(x, y) = |\text{gray im1}(x, y) - \text{gray im2}(x, y)|$

IF SUM OF $G(x, y) > T$, SCENE CHANGE : T IS THRESHOLD VALUE.

NOTE THAT gray $\text{imN}(x, y)$ IS PIXEL VALUE IN $(x, y)$ OF N FRAME.

FIG. 4

$G(x, y) = |\text{gray im1}(x, y) - \text{gray im2}(x, y)|$

IF (PIXEL NUMBER UPON G(x, y)>T1)>T2, SCENE CHANGE : T1, T2 ARE THRESHOLD VALUES.

NOTE THAT gray imN(x, y) IS PIXEL VALUE IN COORDINATES (x, y) OF N FRAME.

| DYNAMIC IMAGE NAME | ○○ VS ×× 10th GAME |
|---|---|
| KIND | BASEBALL RELAY |
| IMAGE SOURCE | TV RELAY |
| INPUT DATE | 4.23, 1993 |
| TOTAL FRAME NUMBER | 20345 |
| SCENE NUMBER | 1045 |
| SCENE INFORMATION | • |

(First four rows: RELATIONAL INFORMATION)

| SCENE NUMBER | START FRAME | END FRAME | CHARACTERISTICS AMOUNT (SCENE LENGTH) |
|---|---|---|---|
| 1 | 1 | 10 | 10 |
| 2 | 11 | 125 | 115 |
| 3 | 126 | 242 | 117 |
| ⋮ | ⋮ | ⋮ | ⋮ |
| 1045 | 20112 | 20345 | 234 |

DESIGNATED AREA MANAGEMENT TABLE

| REGION_NAME | REGION_START_X | REGION_START_Y | REGION_WIDTH | REGION_HEIGHT | TABLE_POINTER |
|---|---|---|---|---|---|
| STRIKE_COUNT | 414 | 321 | 100 | 30 | ● |
| | | | | | |
| | | | | | |

205

ATTRIBUTE VALUE TABLE

| TYPE | VALUE | IMAGE-POINTER |
|---|---|---|
| INTEGER | 0 | ● |
| INTEGER | 1 | ● |
| INTEGER | 2 | ● |

SAMPLE IMAGE DATA

PSTRIKE-COUNT-0 (0.0)
PSTRIKE-COUNT-1 (0.0) — 100
PSTRIKE-COUNT-2 (0.0)
30

METHOD AND APPARATUS FOR RETRIEVING DYNAMIC IMAGES AND METHOD OF AND APPARATUS FOR MANAGING IMAGES

BACKGROUND OF THE INVENTION

1. Field of the Invention

The present invention relates to a method of and an apparatus for retrieving images and a method of and an apparatus for managing images, capable of efficiently retrieving desired dynamic images from dynamic images generated in a short period of time.

2. Related Background Art

As a method of retrieving desired dynamic images from those dynamic images which have been stored in advance, there is a method for retrieving the desired dynamic images according to classification codes and associated information such as positional data of all dynamic images which are stored for each title of dynamic images and a method for visually retrieving the dynamic images by a user while actually feeding the dynamic images at a high speed by the user or directly retrieving the dynamic images at a specified interval while observing frame sequences.

As a method for retrieving the dynamic images by using the images to be retrieved, one frame of images to be retrieved has been entered and a frame corresponding to the frame image entered has been selected from all frames for actual retrieval.

However, in a method of retrieving the dynamic images according to the above-described classification code such as positional data, the user should store the positional data in connection with each title of the dynamic image; for example, even though the user has wanted to know the data at a position on a video tape where the desired title is stored, the dynamic image could not be retrieved if there were no clue except the video tape.

In a method of visually retrieving the dynamic images in rapid feeding, there has been a problem that, though this method can be executed if the number of dynamic images stored is small, a time required for retrieval would be longer and therefore the method would be unpractical if a number of dynamic images are stored.

In a method of retrieving dynamic images by using images to be retrieved, it is necessary to determine whether a frame image entered is identical to a frame image of dynamic images.

Though pattern matching is available as a practical method of retrieval, there has been a problem that pattern matching for retrieval requires a lot of time.

As another method, a histogram of images and characteristics amount matching for determining whether the image includes special information (for example, character A) are available for retrieval. However, it is necessary to calculate in advance the characteristics amount for each frame as a whole at the time storage of images and a lot of time is required for such calculation.

In other words, in case of retrieval by using the characteristics of the image, for example, an attribute value information as "character "A" is included in the image", such attribute value information should be given to the storage process and the information should be manually entered to ensure accurate and minute entry of information and therefore a lot of time has been required and it has been practically impossible to carry out such input operation, depending on the number of subject frames. Lately, studies as to automatic extraction of the attribute value information in accordance with the contents of images have been conducted ("Image Retrieval Adapted for Subjective Similarity" the treatise magazine of the Information Processing Society, Vol. 31, No. 2, pp. 227–236 and others). The information extracted from images has been controlled and stored as array values at the characteristics amount level. However, the above-described automatic extraction also includes a problem in the aspect of accuracy.

In this case, therefore, a difference in level exists between the attribute value information and the characteristics amount information to be provided for retrieval and another art to compensate for this difference is required for obtaining a proper accuracy.

SUMMARY OF THE INVENTION

An object of the present invention is to provide a method of and an apparatus for retrieving dynamic images and a method of and an apparatus for managing images capable of solving the above-described problems.

Another object of the present invention is to provide a method of and an apparatus for retrieving dynamic images and a method of and an apparatus for managing images capable of efficiently retrieving dynamic images in a short period of time.

A further another object of the present invention is to provide a method of and an apparatus for retrieving dynamic images by which a dynamic image is used as a search key.

A preferred embodiment of the present invention to attain the above-described objects is a method of retrieving dynamic images corresponding to dynamic images entered for retrieval from dynamic images of a database, comprising a first extraction step for extracting a characteristics amount in accordance with a scene change of a dynamic image of the database; a second extraction step for extracting a characteristics amount in accordance with a scene change from the dynamic image entered for retrieval; and a determination step for determining a dynamic image corresponding to the dynamic image entered for retrieval, which is included in the dynamic images of the database, from said characteristics amounts extracted by the first extraction step and said second extraction step.

A further another object of the present invention is to provide a method and an apparatus for retrieving dynamic images and a method of and an apparatus for managing images capable of retrieving in a short period of time and saving manpower wherever possible.

A further another object of the present invention is to provide a method and an apparatus for retrieving dynamic images and a method of and an apparatus for managing images which have novel functions.

Other objects of the present invention will be obvious from the following embodiments and the accompanying drawings.

DETAILED DESCRIPTION OF THE PREFERRED EMBODIMENTS

Preferred embodiments of the present invention are described in detail, referring to the accompanying drawings.

Figure 1:
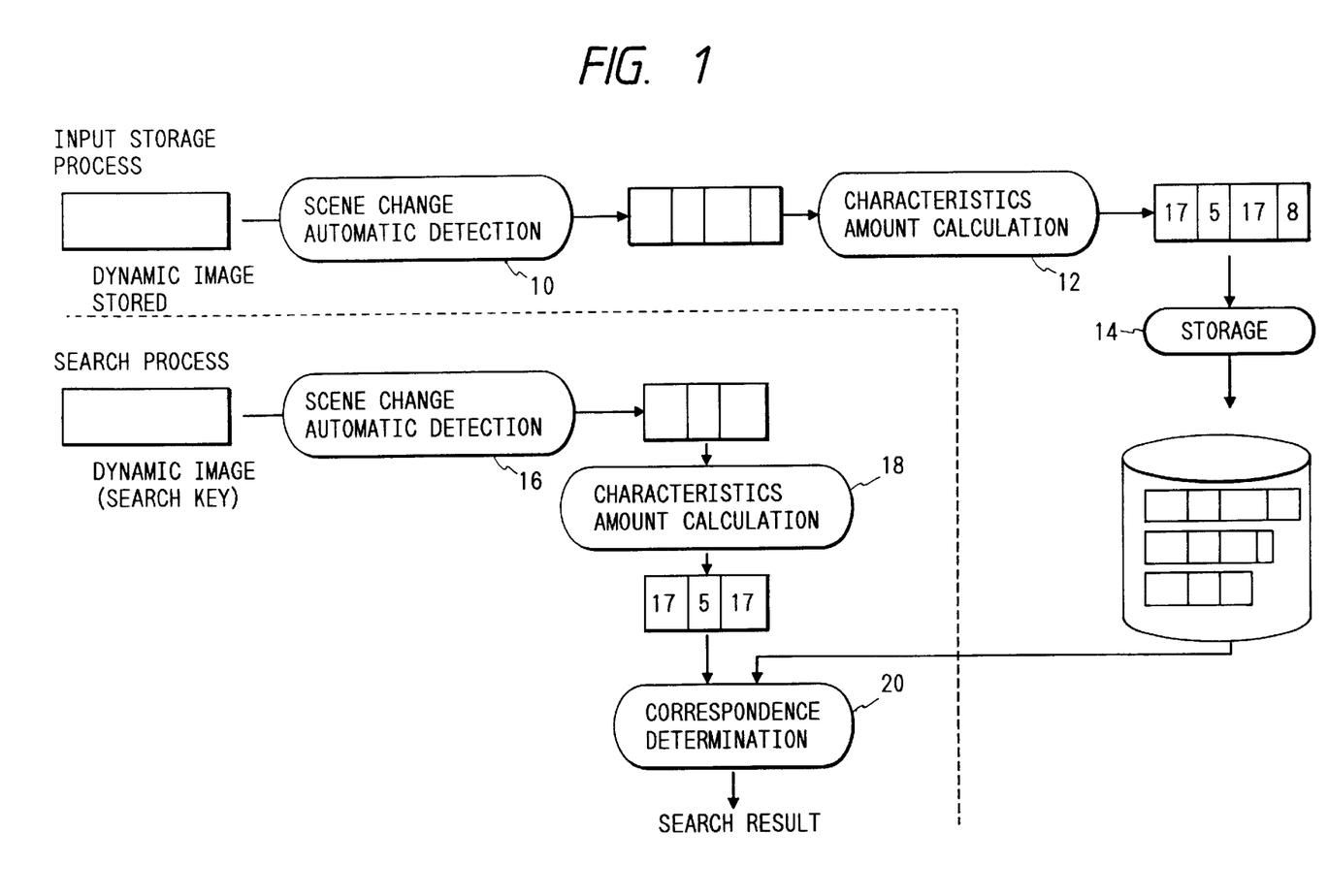
FIG. 1 is a flow chart showing the steps of a first embodiment of the present invention.

Referring to FIG. 1, there is shown a flow chart of procedures of an embodiment according to the present invention. Processing steps can be classified into an input storage step for storing a plurality of dynamic images to be retrieved and a retrieving step for executing retrieval by using the dynamic images to be retrieved. This embodiment is characterized with scene change automatic detection means 10 and 16, characteristics amount calculating means 12 and 18, and correspondence determination means 20.

Figure 2:
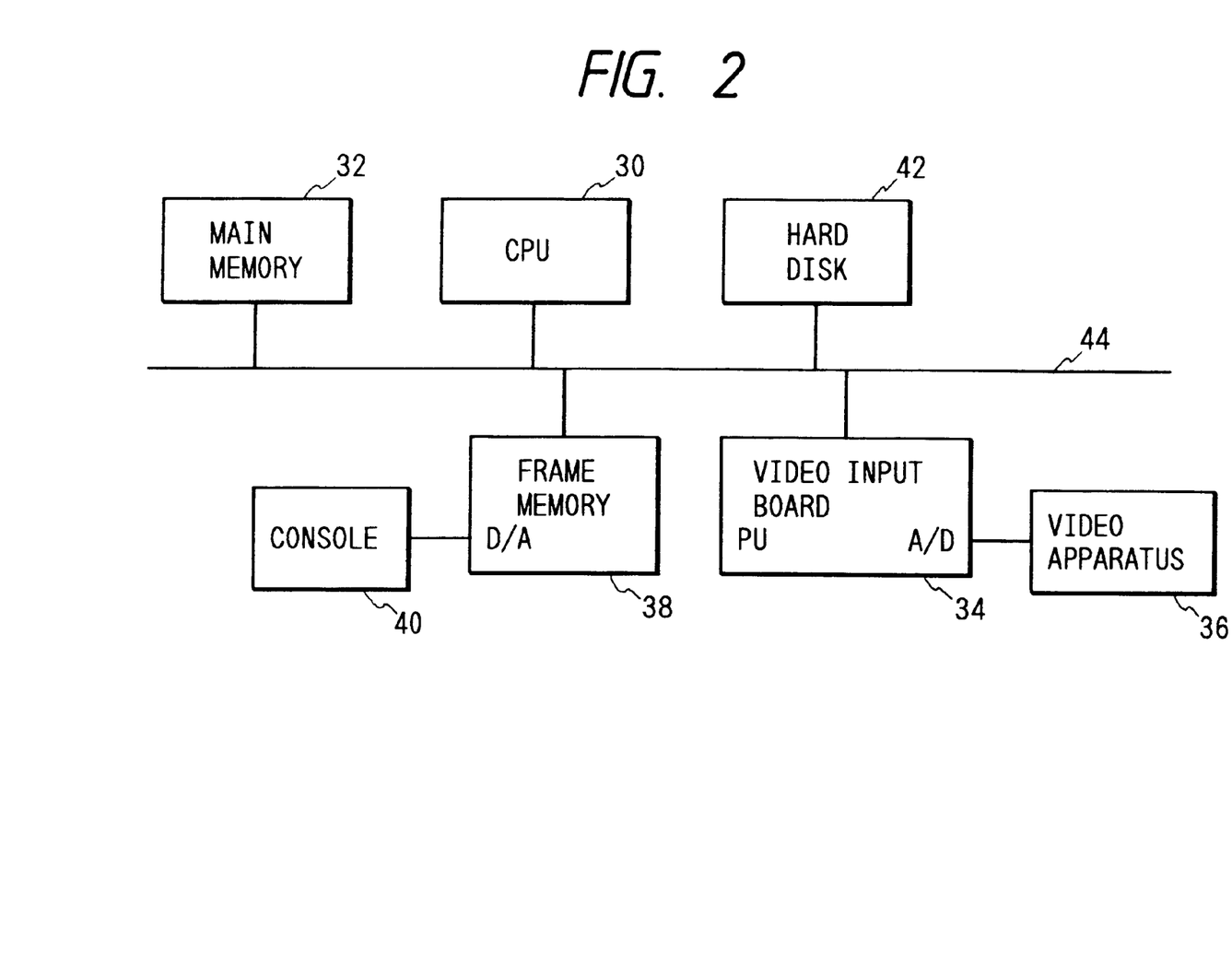
FIG. 2 is a block diagram showing a structure of hardware for implementing the present embodiment.

Referring to FIG. 2, there is shown a block diagram illustrating a structure of hardware for implementing the present embodiment. Reference numerals 30 denote a CPU, 32 is a main memory which has the programs, data and CPU work area for executing the following processing, 34 is a video board for converting analog video signals from a video apparatus 36 to digital signals and transferring these signals to a frame memory 38 through a built-in processor unit, and 40 is a console for displaying the image. 42 is a hard disk device and 44 is a bus for transferring data between respective components of the hardware.

The CPU 30 can directly access to the frame memory 38 and can therefore directly process digital dynamic images.

In the present embodiment, scene information extracted and relational information given at the time of entry and storage of dynamic images for preparing the database are stored in the hard disk 42, and the contents are referred for retrieval.

In the present embodiment, scene change automatic detection means 10, 16 (FIG. 1) is provided both in an input storage circuit for dynamic images at the time of preparation of the database and in a retrieving circuit which applies dynamic images as keys. The scene change refers to a discontinuous change of the image sequence as dynamic images such as, for example, changeover of the camera. In this embodiment, the scene change is detected by actuating the scene change automatic detection means 10, 16 according to software to be processed by the CPU 30.

Dynamic images from the video apparatus 36 which are A/D converted through a video input board are stored in sequence in the frame memory 38 through a bus 44.

Figure 3:
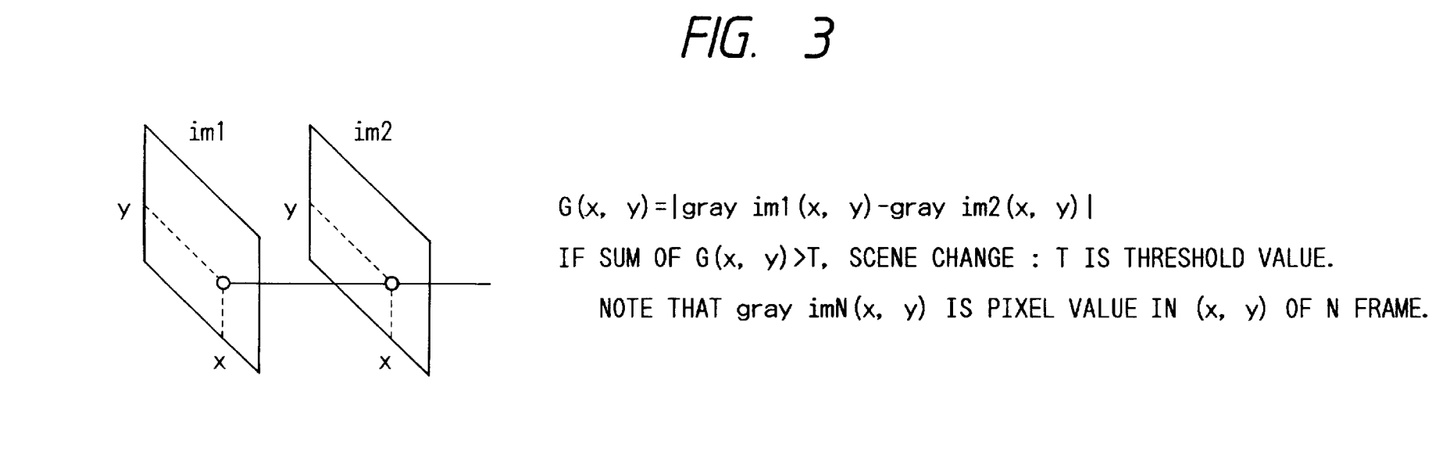
FIG. 3 is an illustration of a scene change detection algorithm.
Figure 4:
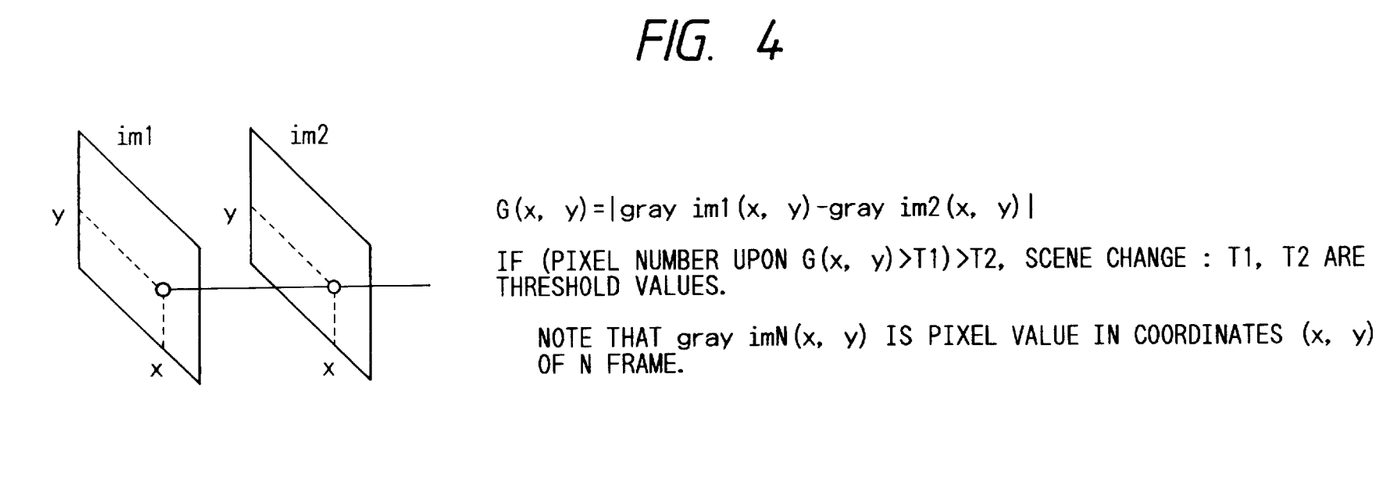
FIG. 4 is an illustration of the scene change detection algorithm.
Figure 5:
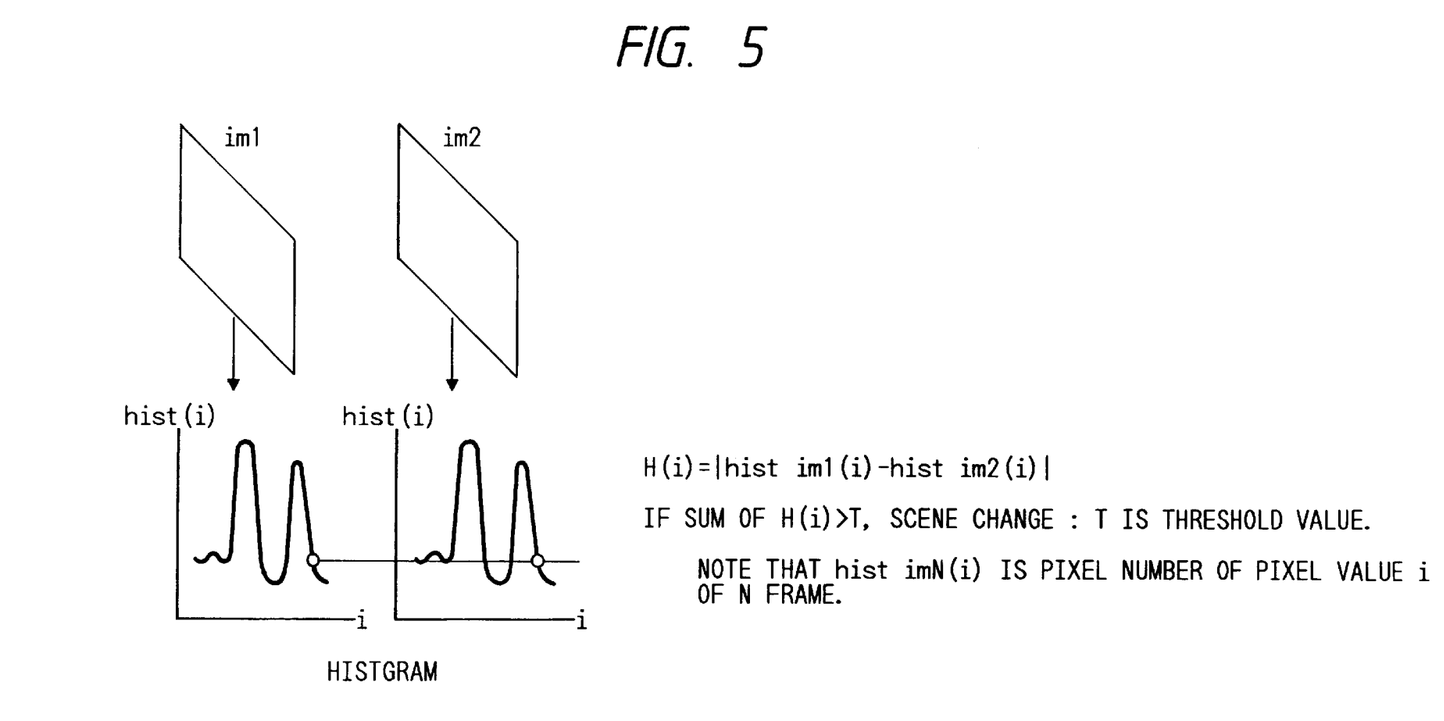
FIG. 5 is an illustration of the scene change detection algorithm.

FIGS. 3, 4 and 5 respectively show a plurality of scene change detection algorithms. FIG. 3 shows a method in which the scene change is determined when a total sum of difference values of image data of the same coordinates of two time-continuing frame images, which is obtained for the whole frame, exceeds a certain threshold value (T). FIG. 4 shows a method in which the scene change is determined when a value obtained by counting the number of pixels for which the difference value of image data of the same coordinates of two time-continuing frame images is larger than the threshold value (T1) exceeds a certain threshold value (T2). FIG. 5 shows a method in which the scene change is determined when the shapes of histograms which are obtained respectively for two time-continuing frame images are not identical. In this connection, the similarity of the shape of the histogram can be determined from the total sum of difference values of respective frequency values in the histograms.

Figure 6:
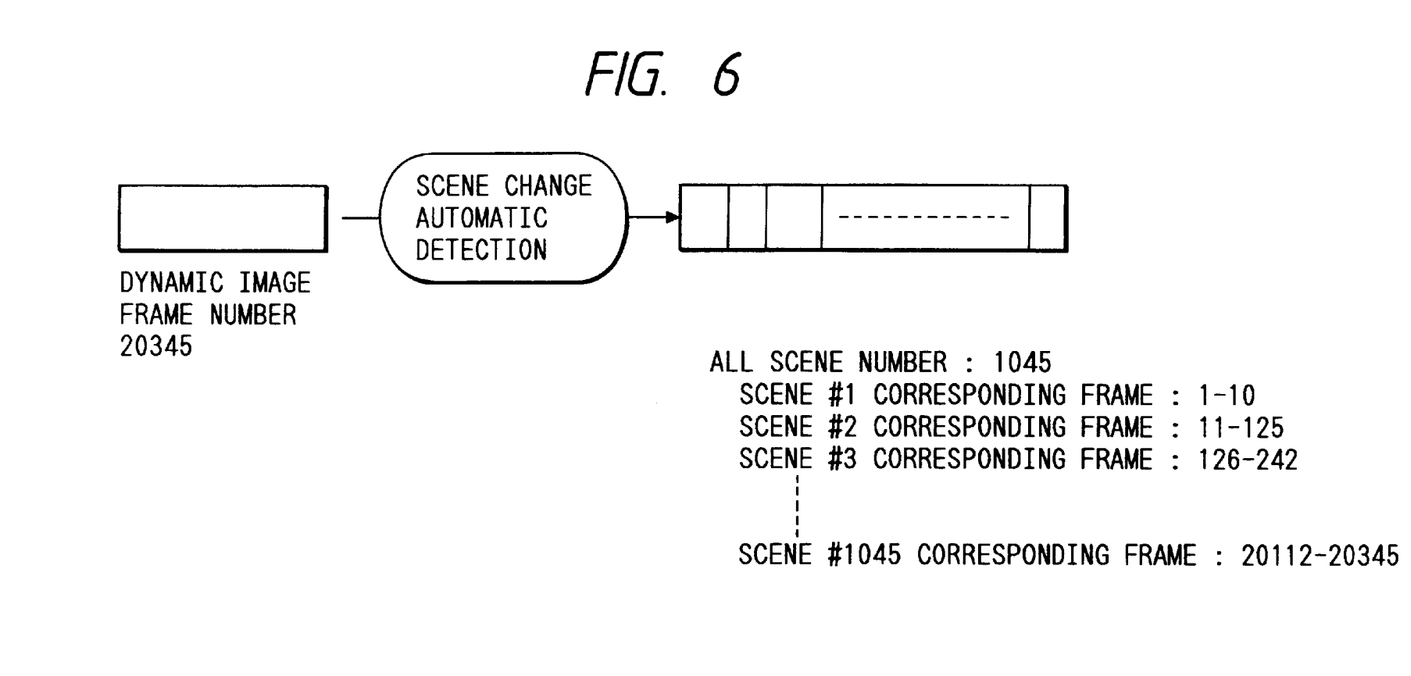
FIG. 6 is a representation of information to be added for the scene change.

When the scene change i detected with respect to an input dynamic image at the time of input storage as described above, the frame position information of the input dynamic images of the scene start frame and the scene end frame is obtained for each scene. Consequently, the number of scenes and a pair of the scene start frame number and the scene end frame number are added to the input dynamic image as shown in FIG. 6.

Figure 7:
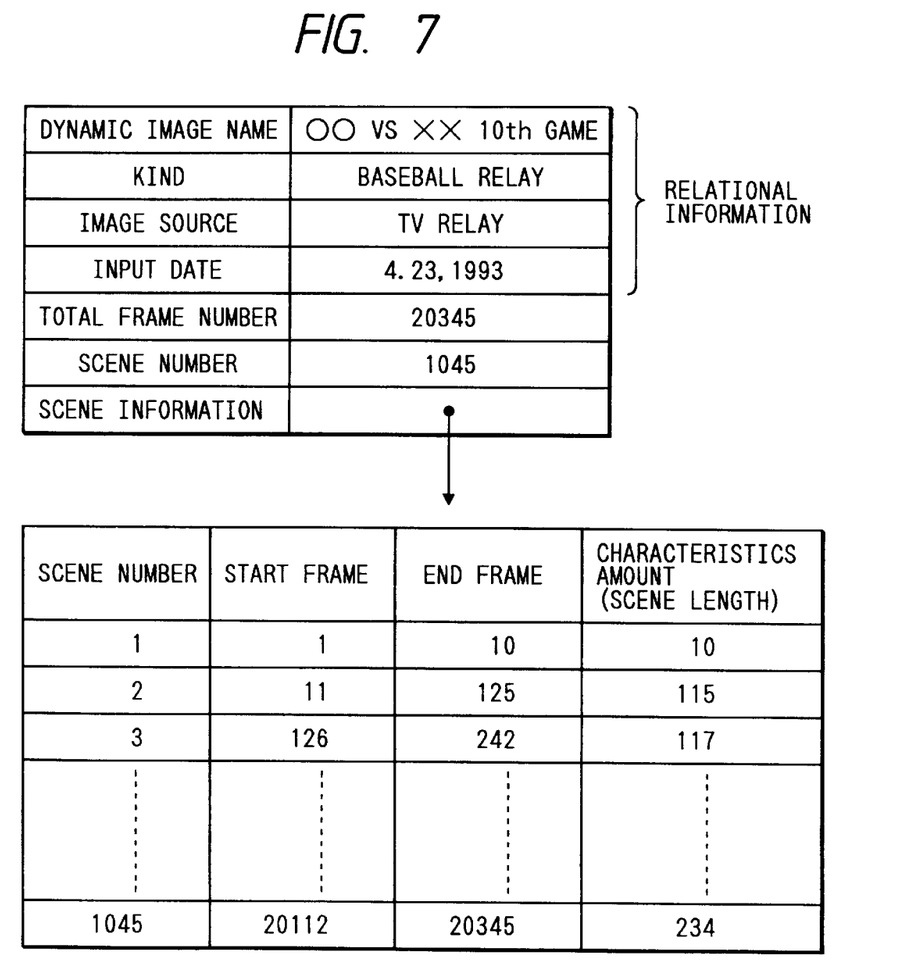
FIG. 7 is a diagram showing relational information of storage regarding the dynamic images entered.

In this embodiment, the characteristics amount extraction means extracts a length of each scene (the number of frames between scene changes) as a characteristics amount. This amount can be calculated by subtracting the start frame number from the end frame number of each scene and adding 1 to the result obtained. In addition, the relational information of dynamic images is also furnished by the user at the time of input storage and respective dynamic images are stored in the hard disk device 42 as shown in FIG. 7. In this case, the dynamic image name, kind, image source and input date are simultaneously stored as an example of relational information.

Figure 8:
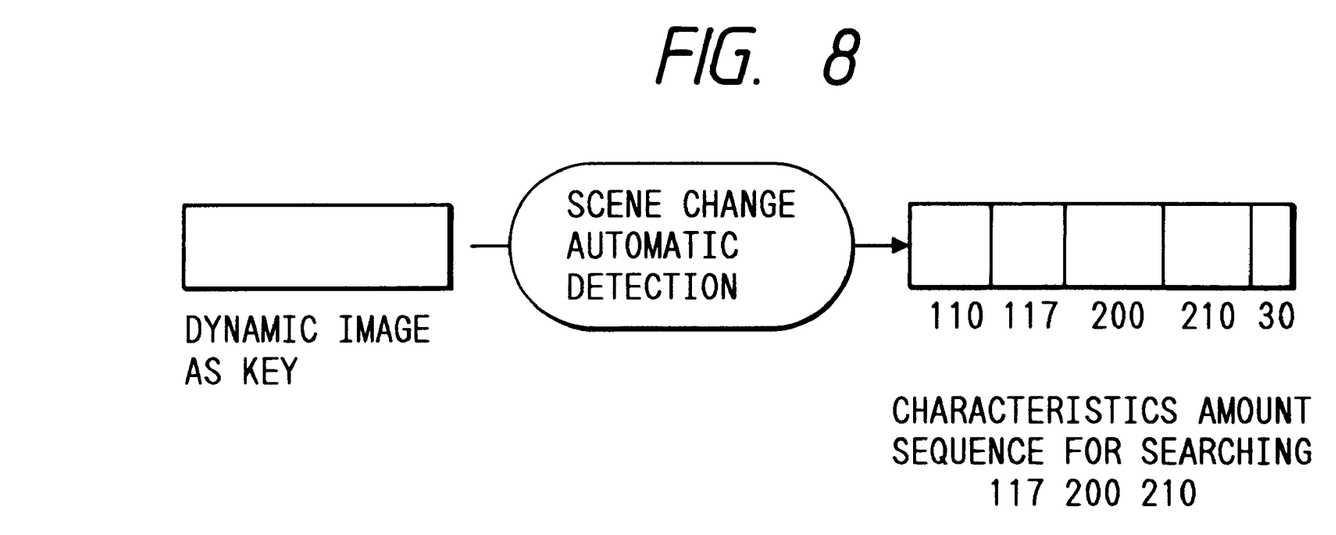
FIG. 8 is a diagram showing a step for extracting a characteristics amount sequence which serves as a search key.

A dynamic image serving as a search key is entered at the time of retrieval, the above-described scene change automatic detection and characteristics amount extraction are carried out for such dynamic image which serves as the search key and a sequence of characteristics amounts (number of frames) is obtained. In this embodiment, when the number of scenes is 3 or less, a message "an input dynamic image which serves the key is excessively short" is displayed and the retrieval is not carried out. When the number of scenes of input dynamic images is 4 or over, the first and last scenes are ignored and only a sequence of scenes included between the first and last scenes is noted. The number of scenes can be other than that of this example. FIG. 8 shows a process from the search key to extraction of the characteristics amount sequence.

Figure 9:
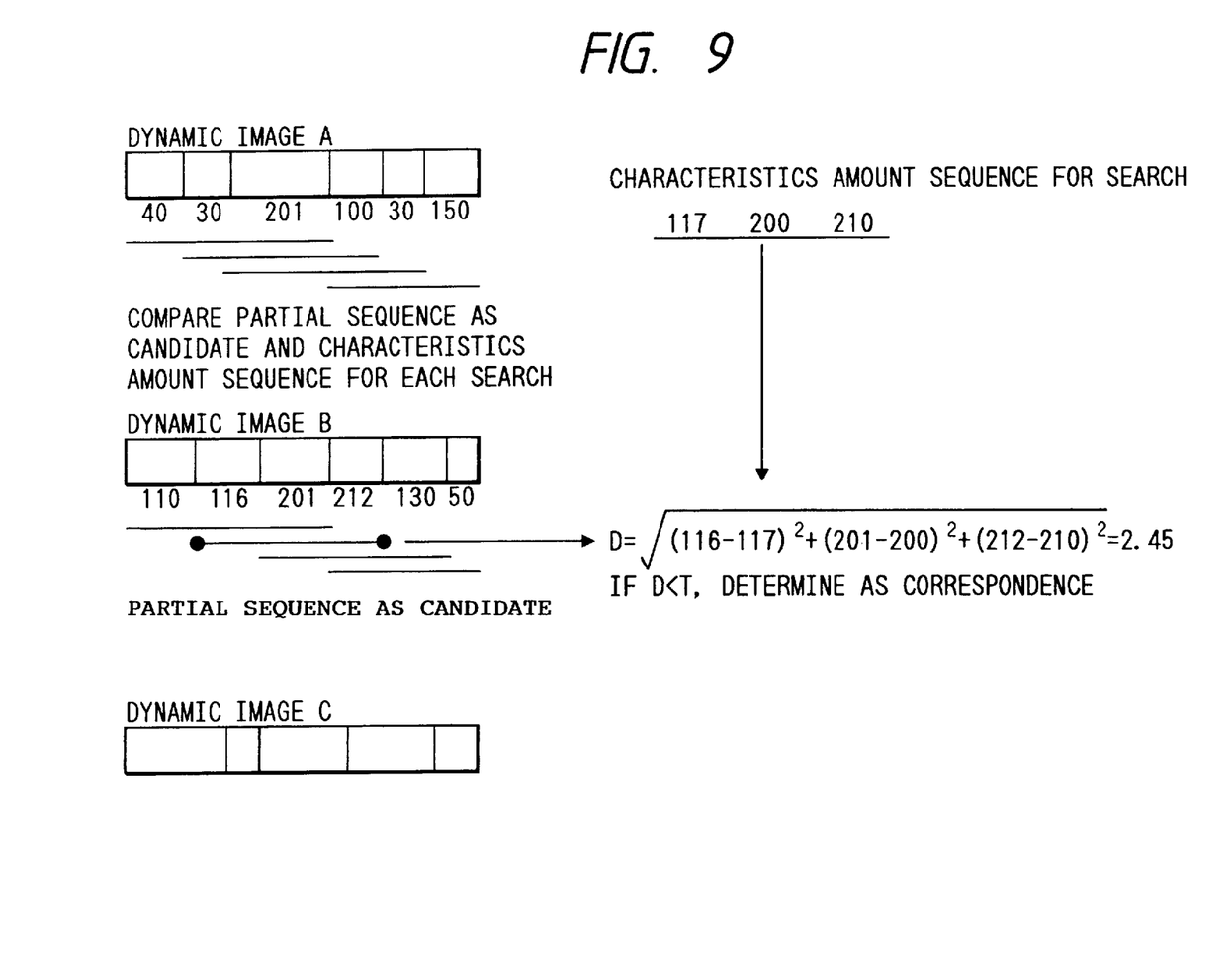
FIG. 9 is a diagram showing a step for determining a correspondence between the dynamic image entered and the dynamic image stored.

Next, it is determined which characteristics amount sequence stored at the time input storage matches with a characteristics amount sequence obtained when the search key is entered. In this embodiment, the determination algorithm regards the characteristics amount sequence to be obtained from the dynamic image simply entered as the search key as a vector, compares it with a characteristics amount stored for the same number of sequences as the characteristics amount sequence of the search key, and compares a distance on a vector space with the threshold value with all partial sequences as candidates. If the distance on the vector space is less than the threshold value, it is regarded that there is a possibility of an image to be retrieved, that is, an appropriate scene. FIG. 9 shows the determination algorithm.

When the appropriate scene is obtained, the relational information of the dynamic image retrieved as a result of retrieval is obtained and displayed to the user. A dynamic image simultaneously retrieved can be displayed for confirmation.

Though the number of frames between scene changes is used as the characteristics amount in the above embodiment, the characteristics amount is not limited to this number of frames and the other characteristics amounts can be used. In this embodiment, an extremely simple algorithm is used to detect the appropriate scene and therefore a faulty result of retrieval may be actually included and such retrieval means rather selection of a candidate. For improvement of the reliability, the accuracy of retrieval can be raised by storing, for example, an image of the center frame of each scene for identifying the candidate for each scene and conducting pattern matching with the center frame of each scene similarly obtained from the input image. Pattern matching in this case is carried out by, for example, processing the total of difference values between images in reference to the threshold value and using the histograms of images.

Though the retrieved image is described with an image of a storage medium such as a hard disk in this embodiment, the image to be retrieved is not limited to the above and it is clear that the present invention applies to the retrieval of a desired dynamic image from dynamic images included in the database transmitted through communications such as personal computer communications.

As easily known from the above description, the present embodiment enables retrieving with dynamic images as search keys. In addition, the embodiment enables to retrieve relational information from given dynamic images in a short period of time without spending a remarkable duration of time either in input storage or in retrieval.

Second Embodiment

Figure 10:
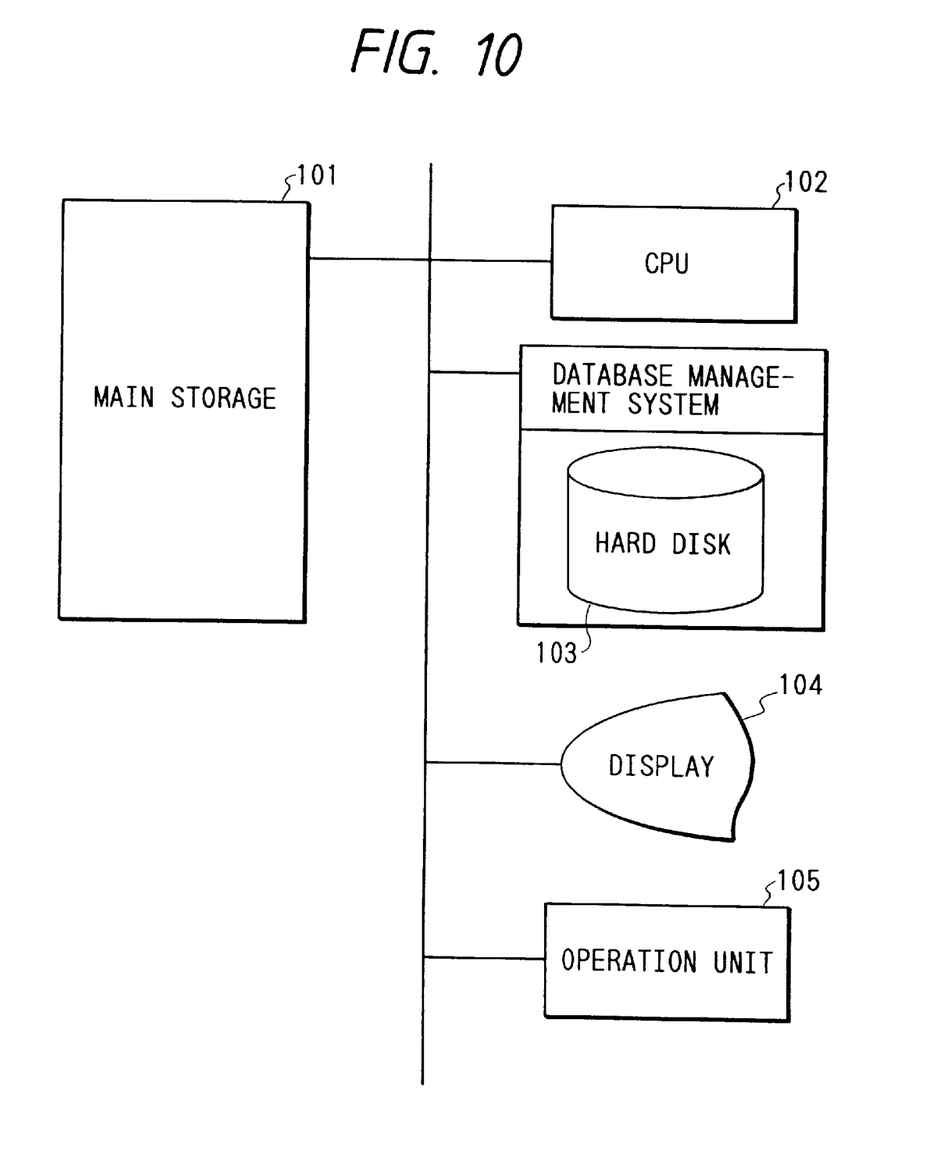
FIG. 10 is a block diagram showing a second embodiment of the present invention.

FIG. 10 is a block diagram showing a second embodiment of the present invention. In FIG. 10, reference numeral 101 denotes a main storage including software modules such as at least four types of modules described later, software for a multi-window and a work area of a CPU 102. 102 is a CPU (central processing unit) for executing a processing according to the software modules on the main storage 101. 103 is a hard disk which stores dynamic images, relational information described later and attribute value information. Data is managed by a database management system. 104 is a display which is used to implement an interactive function with users including acquirement of various information from users and presentation of information such as dynamic images to users under the control of the multi-window system such as an X window. 105 is an operation unit comprising a mouse and a keyboard for operating this system.

Figure 11:
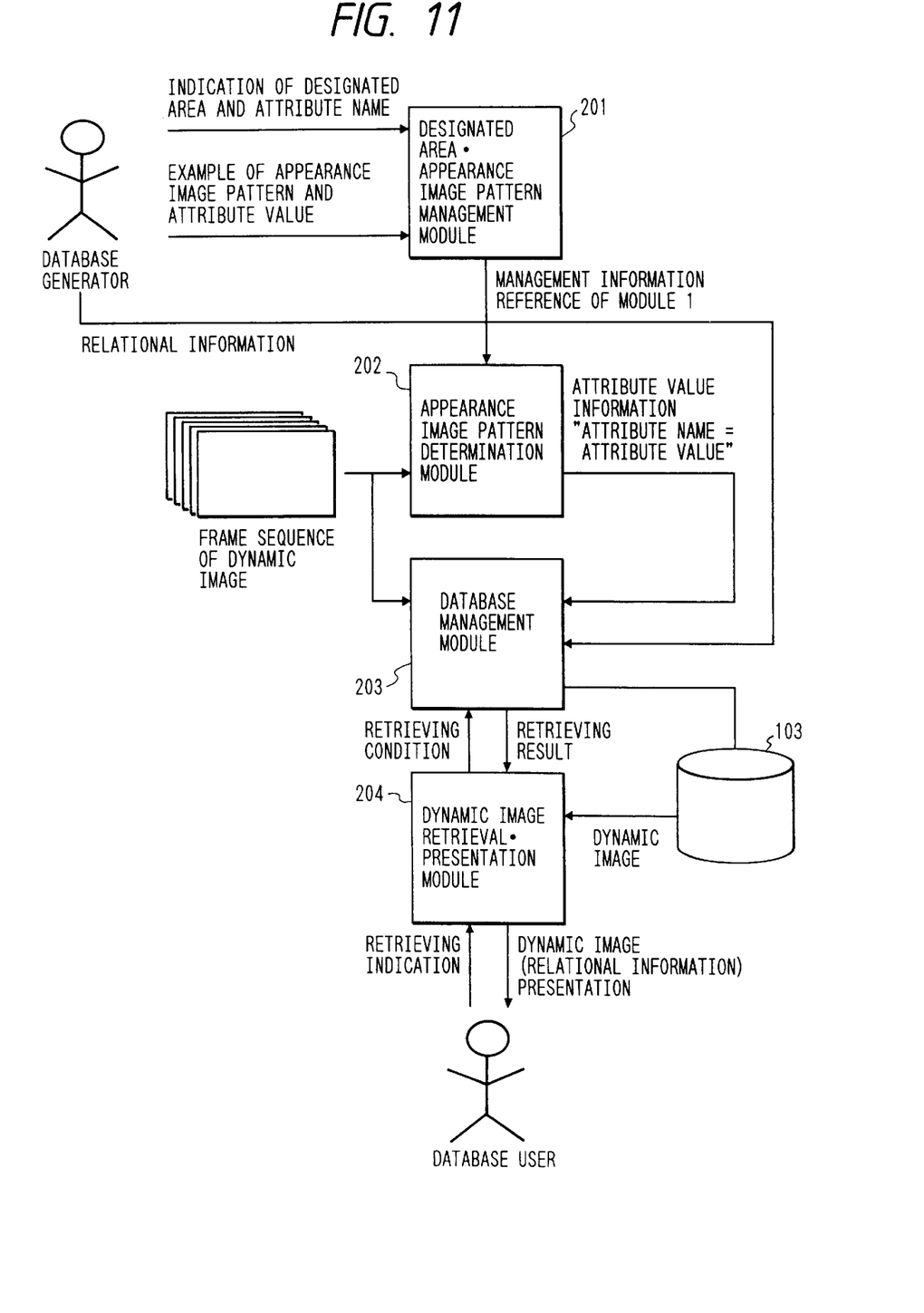
FIG. 11 is a flow chart illustrating respective modules built in the main storage 101 shown in FIG. 1.

FIG. 11 is a flow chart illustrating the modules to be stored in the main storage 101 shown in FIG. 10. In FIG. 11, 201 is a designated area appearance image pattern management module for obtaining and managing the required information through the interactive function with users. In this embodiment, this module simultaneously obtains the designated area information and the attribute name information corresponding to the designated area which are given in the interactive operation, an appearance image pattern which is required as a sample image for detecting the attribute value information from the dynamic image frame to be entered by an appearance image pattern determination module 202, and the attribute values for respective appearance image pattern and stores the information as management information.

202 is an appearance image pattern determination module, wherein, if the designated area appearance image pattern management module determines that the prior designated attribute is provided as a result of determination as to whether a designated area in each frame of dynamic images entered according to the preceding management information is an attribute designated in the appearance image pattern determination module 202, the attribute value information of the corresponding image pattern is outputted to the database management module 203.

203 is a database management module which is a functional module, wherein the attribute value information and the dynamic frame sequence which are determined for each dynamic image frame sequence to be entered by the appearance image pattern determination module 202 are managed as numerical character information and image information in the hard disk 103 and management of these information is implemented by using general database management systems which are commercially available. Numerical character information such as relational information including dynamic image names and dynamic image recording time which are entered by the database users in correspondence to the attribute value information outputted from the appearance image pattern determination module 202 are managed together with the attribute value information in the form of a table in the hard disk 103. An RDB (relational database) which is used as a common database management system provides the retrieving function in the framework of the relational operation and can therefore be directly used for dynamic image retrieval.

204 is a dynamic image retrieval/presentation module which presents dynamic images retrieved from the database and a certain frame of the dynamic images by using the database management module 203 based on the retrieving condition derived from the relational information of the frame name and others from the users of this retrieving system and the attribute information for more minutely classifying the dynamic images based on the relational information. Dynamic image data corresponding to the dynamic image name which represents the contents of the dynamic image as a result of retrieval outputted from the database management module 203 is read out from the hard disk 103 and displayed on the display 104 as the result of retrieval.

As a practical example in this embodiment, a process is described for obtaining, as the attribute value information, a strike count information to be displayed on a corner of a TV screen in a baseball TV relay scene as the subject dynamic image data of retrieval.

Figure 12:
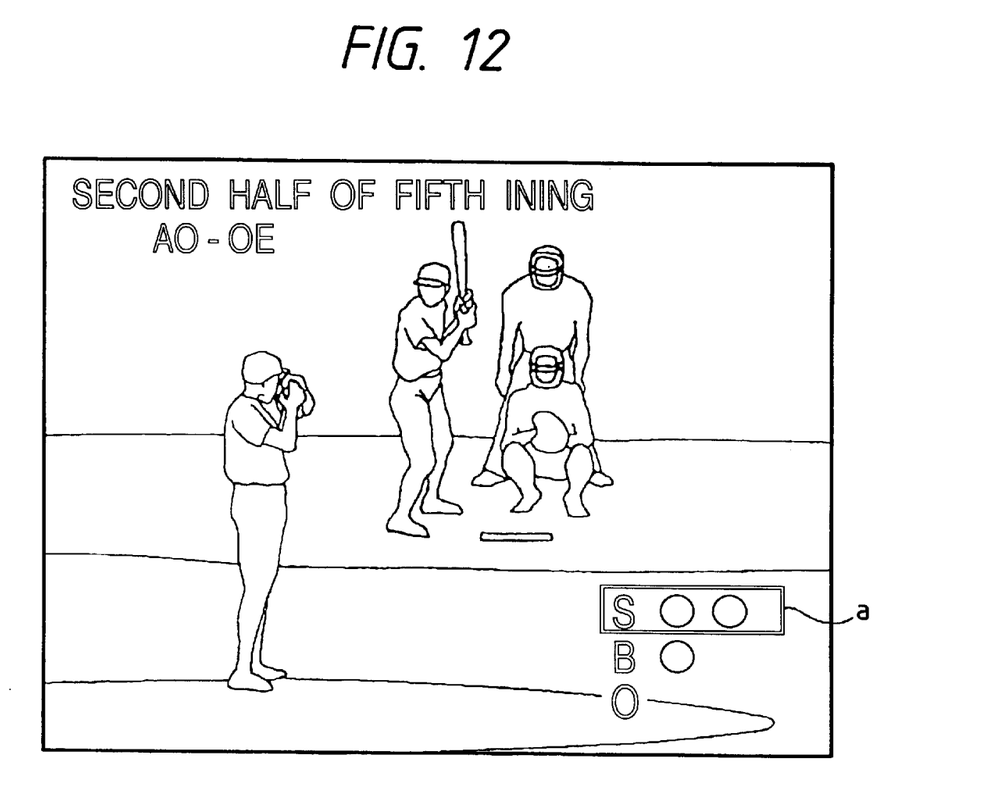
FIG. 12 is an example illustration of the designated region.

In an interactive environment using the window system as the base, a programmer of the dynamic image database designates, as a designated area, a rectangular area of the TV screen where the strike count is displayed as shown in FIG. 12 with the mouse of the operation unit 105, and further designates the frames which respectively display the strike count of 0, 1 and 2 as a sample frame of the appearance image pattern while scrolling the frames of dynamic images. The attribute name for the designated area and the attribute values for respective sample frames are entered from the keyboard of the operation unit 105.

The following describes the modules to be stored in the main storage 101 shown in FIG. 10.

Figure 13:
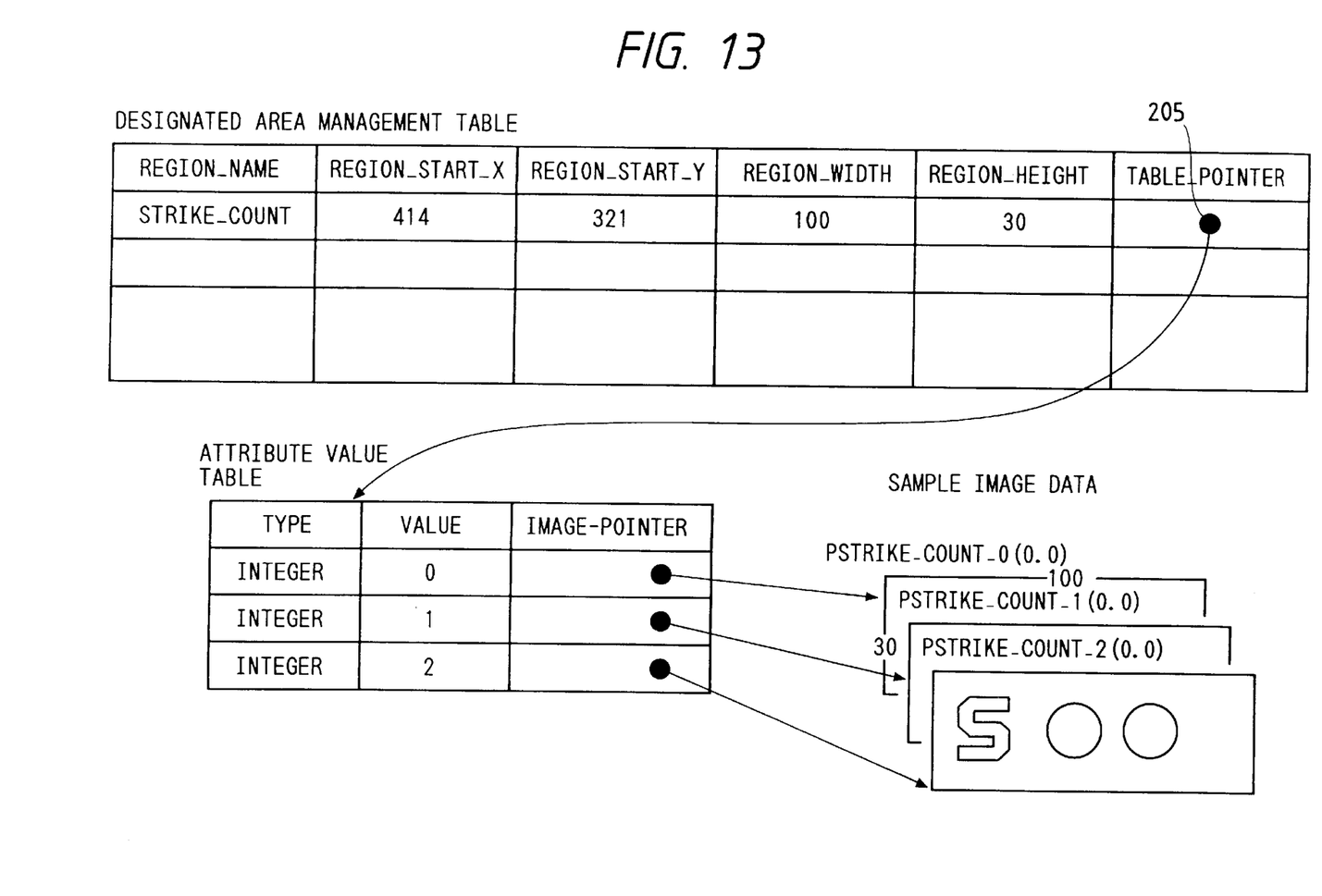
FIG. 13 is an example of a designated area management table and an attribute value table.

The designated area appearance image pattern management module 201 manages the data related to the area designated by the operation unit 105 in the form of table as shown in FIG. 13. Specifically, assuming the left-side vertex coordinates of the display as (x, y)=(0, 0), four integral values in total, including the upper left vertex coordinates (region-start-x, region-start-y) and the width and height of the square (respectively, a region width and a region height), which are the designated area information, and the given attribute name ("strike_count") are managed in the form of a table. A list of those values which can be simultaneously obtained is managed by the pointer 205. More specifically, the available attribute values and the sample image data (sample pattern) from which the areas of the sample frames corresponding to the attribute values are cut out are managed as the arrayed data as shown in FIG. 13.

The appearance of image pattern determination module 202 determines whether or not an attribute value can be set for respective frames of the frame sequence of dynamic images to be entered while referring to the table shown in FIG. 13 which is managed by the designated area appearance image pattern management module 201. As a result of determination, such attribute value information as an "attribute name=attribute value" likewise, for example, "strike_count=1" is outputted. When it is determined that a corresponding image pattern has not appeared, such information as "strike_count=nil" is outputted. The attribute value information as the above-described output is stored in the hard disk 103 in correspondence to the relational information given by the database programmer in the database management module, managed by the database module, and used for retrieval.

Various methods can be assumed as a method for determining the appearance of the image pattern in the appearance image pattern determination module. In this embodiment, a method using template matching is described. A pixel value of a sample pattern t for respective attribute values of the designated area is assumed as Pt (x, y). t refers to one of strike_count_0, strike_count_1 and strike_count_2, denoting respective sample patterns. x and y respectively refer to $0 \leq x \leq$ region_width-1 and $0 \leq y \leq$ region_height-1. The region_width and the region_height denote the size of the designated area and indicate the width and height of the sample pattern as shown in FIG. 13. If the pixel value of the frame of dynamic images to be entered into the appearance image pattern determination module 202 is assumed as Q (x, y), $$SUMt(\delta, \gamma) = \sum_{x,y} |Pt(x, y) - Q(\text{region\_start\_x} + x + \delta, \text{region\_start\_y} + y + \gamma)|$$

is calculated in the range of $-t \geq \delta$ and $\gamma \leq t$ (t is a small value of approximately 5, indicating the range of search for template matching) and the least values shall be respectively minSUMt. If the minimum value of minSUMt is larger than a certain threshold value in a range where t is available, it means that the result of template matching is not identical to any of sample patterns and it shall be determined that there is no corresponding attribute value ("strike_count=nil"), and otherwise the attribute value corresponding to t which derives the minimum value is outputted (for example, "strike_count_=1" if t is the minimum as t=strike_count_1).

The dynamic image retrieval/presentation module 204 reads and displays the relational information of the dynamic image name indicating the contents of the dynamic image corresponding to the dynamic image of the frame which is retrieved as the result of retrieval outputted by the database management module 203 and the dynamic image corresponding to the retrieval to indicate the retrieved dynamic image and a certain frame in the dynamic image.

This embodiment has used the method for pattern-matching the sample image data and the designated area in the input dynamic image frame in a retrieval operation. However, in a superposed information such as a Telop (television opaque) which is outputted as being synthesized in the dynamic image, the original dynamic image portion of the background part is often used as is. An error may be caused in determination of the appearance image pattern, depending on the accuracy of template matching by comparing the pixels of the Telop part and those of the dynamic image part. For designating the area in the appearance image pattern management module, those colors to be noted are simultaneously specified. A plurality of colors to be noted can be selected by clicking the mouse on the colors to be noted and the accuracy of determination can be improved by carrying out the template-matching only for the corresponding areas.

If the pixel values of both the sample pattern and the input frame are not included in the colors in actual pattern matching, the difference values are calculated as 0 and the pixel values of the areas of colors to be noted are compared.

In this embodiment, the attribute value information is detected by template-matching the appearance image pattern of the designated area. However, it is obvious that the present invention is not limited to this method and the attribute value information can be detected according to the result of detection of a histogram of the designated area.

As described above, differing from the related art by which the attribute value information is set from all frames of dynamic images, the present invention enables to automatically set the attribute value information for respective frames included in the dynamic images according to the image pattern which appears in the designated areas of the dynamic images and therefore a lot of time is not required for automatic detection of the attribute value information and the attribute color information need not be manually entered, thereby greatly saving manpower.

In addition, the attribute information can be stored and managed as numerical and character information in general database management modules and therefore the present invention provides an effect that the retrieval related to the contents of dynamic images can be implemented by using a flexible retrieving condition description such as relational operation of attribute values.

What is claimed is:

1. An image retrieval system comprising:
   a first characteristic sequence extraction means for extracting a first scene change characteristic sequence for a moving image in accordance with a scene change of each scene of the moving image;
   a storage means for storing the moving image with the extracted first characteristic scene change sequence for the moving image;
   a second characteristic sequence extraction means for extracting a second scene change characteristic sequence in accordance with a scene change from an entered search moving image; and
   a comparison means for comparing the first scene change characteristic sequence of the stored moving image with the scene change characteristic sequence of the search moving image to determine if the stored moving image corresponds to the search moving image.

2. An image retrieval system according to claim 1, wherein the first characteristic amount and the scene change characteristic amount each comprises a number of frames between scene changes.

3. An image retrieval system according to claim 1, wherein the first characteristic amount and the scene change characteristic amount each comprises a vector composed of a plurality of components, and the comparison by said comparison means is made in accordance with a distance in a vector space between a characteristic amount extracted by said first characteristic amount extraction means and a scene change characteristic amount extracted by said second characteristic amount extraction means.

4. An image retrieval system according to claim 1, further comprising:
    means for storing relational information for each characteristic amount extracted by said first characteristic amount extraction means.

5. An image retrieval system according to claim 1, further comprising:
    a display means for displaying relational information in accordance with the entered search moving image according to the comparison made by said comparison means.

6. An image retrieval system according to claim 5, wherein a moving image corresponding to the entered search moving image is displayed with the relational information according to the comparison made by the comparison means.

7. An image retrieval system according to claim 1, wherein the scene change is automatically extracted.

8. An image retrieval method comprising:
    a first characteristic sequence extraction step, of extracting a first scene change characteristic sequence for a moving image in accordance with a scene change of each scene of the moving image;
    a storage step, of storing in a storage means the moving image with the extracted first characteristic scene change sequence for the moving image;
    a second characteristic sequence extraction step, of extracting a second scene change characteristic sequence in accordance with a scene change from an entered search moving image; and
    a comparison step, of comparing the first scene change characteristic sequence of the stored moving image with the second scene change characteristic sequence of the search moving image to determine if the stored moving image corresponds to the search moving image.

9. An image retrieval method according to claim 8, wherein the first characteristics amount and the scene change characteristic amount each comprises a number of frames between scene changes.

10. An image retrieval method according to claim 8, wherein the first characteristic amount and the scene change characteristic amount each comprises a vector composed of a plurality of components and the comparison by said comparison means is made in accordance with a distance in a vector space between a characteristic amount extracted by said first characteristic amount extraction step and a scene change characteristic amount extracted by said second characteristic amount extraction step.

11. An image retrieval method according to claim 8, further comprising:
    a storing step of storing relational information for each characteristic amount extracted by said first characteristic amount extraction step.

12. An image retrieval method according to claim 8, further comprising:
    a display step of displaying relational information in accordance with the entered search moving image according to the comparison made by said comparison step.

13. An image retrieval method according to claim 12, wherein a moving image corresponding to the entered search moving image is displayed with the relational information according to the comparison made by the comparison step.

14. An image retrieval method according to claim 8, wherein the scene change is automatically extracted.

15. An image retrieval apparatus comprising:
    a characteristic sequence extraction means for extracting a scene change characteristic sequence in accordance with a scene change from an entered search moving image; and
    a comparison means for comparing a scene change characteristic sequence of a moving image, stored together with the moving image in storage means, with the scene change characteristic sequence of the search moving image to determine if the moving image stored in said storage means corresponds to the search moving image.

16. An apparatus according to claim 15, wherein the scene change characteristic amount is a number of frames between scene changes.

17. An apparatus according to claim 15, wherein said extraction means extracts the scene change according to difference between two continuous frames.

18. An apparatus according to claim 15, wherein said storage means is a hard disc.

19. An apparatus according to claim 15, wherein said storage means stores at least one of name, kind and input date information of the moving image.

20. An apparatus according to claim 19, further comprising display means, and wherein said display means displays at least one of name, kind and input date of the moving image when it is determined by said comparison means that the moving image stored in said storage means corresponds to the search moving image.

21. An image retrieval method comprising:
    extracting a scene change characteristic sequence in accordance with a scene change from an entered search moving image; and
    comparing a scene change characteristic sequence of a moving image, stored together with the moving image in storage means, with the scene change characteristic sequence of the search moving image to determine if the moving image stored in the storage means corresponds to the search moving image.

22. The method according to claim 21, wherein the scene change characteristic amount is a number of frames between scene changes.

23. The method according to claim 21, wherein said extractions step extracts the scene change according to difference between two continuous frames.

24. The method according to claim 21, wherein said storage means is a hard disc.

25. The method according to claim 21, wherein said storage means stores at least one of name, kind and input date information of the moving image.

26. The method according to claim 25, further comprising a display step, and wherein said display step displays at least one of name, kind and input date of the moving image when it is determined by said comparison step that the moving image stored in said storage means corresponds to the search moving image.

* * * * *

UNITED STATES PATENT AND TRADEMARK OFFICE
CERTIFICATE OF CORRECTION

PATENT NO. : 6,606,636 B1
DATED : August 12, 2003
INVENTOR(S) : Hiroshi Okazaki et al.

It is certified that error appears in the above-identified patent and that said Letters Patent is hereby corrected as shown below:

Title page,
Item [*] Notice, "This patent is subject to a terminal disclaimer." should be deleted.
Item [56], References Cited, U.S. PATENT DOCUMENTS, insert
-- 6,480,841     11/2002          Higashio et al.
   6,480,840     11/2002          Zhu et al.
   6,463,432     10/2002          Murakawa --
OTHER PUBLICATIONS, insert
-- "Three-Dimensional Interfaces for Querying by Example in Content-Based Image Retrieval", Visualization and Computer Graphics, IEEE Transactions on, Volume 8, Issue 4, Oct./Dec. 2002, pp. 305-318, Assfalg et al.
"A Human-Oriented Image Retrieval System Using Interactive Genetic Algorithm", Systems, Man, and Cybernetics, Part A, IEEE Transactions on Volume 32, Issue 3, May 2002, pp. 452-458, Cho et al.
"Fuzzy Color Histogram and Its Use in Color Image Retrieval", Image Processing, IEEE Transactions on, Volume 11, Issue 8, August 2002, pp. 944-952, Han et al. --.

Column 4,
Line 18, "i" should read -- is --.

Column 8,
Line 66, "comprises" should read -- comprise --.

Column 9,
Line 45, "characteristics" should read -- characteristic --; and
Line 46, "comprises" should read -- comprise --.

Signed and Sealed this

Thirteenth Day of April, 2004

JON W. DUDAS
*Acting Director of the United States Patent and Trademark Office*